United States Patent [19]
Winter et al.

[11] Patent Number: 5,904,879
[45] Date of Patent: May 18, 1999

[54] PARTIAL OXIDATION OF WASTE PLASTIC MATERIAL

[75] Inventors: John Duckett Winter, Yorba Linda, Calif.; Paul Ellis Brickhouse; Ronald Frederick Tyree, both of Houston, Tex.; John S. Stevenson, Yorba Linda, Calif.; Gregory Joseph Mayotte, Wappingers Falls, N.Y.; Jerrold Samuel Kassman, League City; Byron Von Klock, Beaumont, both of Tex.

[73] Assignee: Texaco Inc, White Plains, N.Y.

[21] Appl. No.: 08/908,876

[22] Filed: Aug. 8, 1997

Related U.S. Application Data

[63] Continuation of application No. 08/888,144, Jul. 3, 1997
[60] Provisional application No. 60/021,878, Jul. 17, 1996, provisional application No. 60/021,879, Jul. 17, 1996, provisional application No. 60/021,885, Jul. 17, 1996, and provisional application No. 60/024,472, Aug. 23, 1996.

[51] Int. Cl.⁶ .................................. C07C 1/02; C01B 7/00
[52] U.S. Cl. ......................................... 252/373; 423/240 R
[58] Field of Search ......................... 252/373; 423/240 R

[56] References Cited

U.S. PATENT DOCUMENTS

| | | | |
|---|---|---|---|
| 5,445,659 | 8/1995 | Khan | 252/373 |
| 5,534,040 | 7/1996 | Khan | 252/373 |

*Primary Examiner*—Paul J. Killos
*Assistant Examiner*—Jafar Parsa
*Attorney, Agent, or Firm*—Henry H. Gibson; Rodman & Rodman

[57] ABSTRACT

An integrated liquefaction and gasification process converts bulk particulate halogen-containing waste plastic materials with minimal particle size reduction into a synthesis gas and a non-leachable, vitreous environmentally nontoxic slag. The process involves melting and cracking bulk particulate halogen-containing waste plastic material to form a lower boiling point, lower molecular weight halogen-containing oil composition which then undergoes partial oxidation in a quench gasifier to produce a synthesis gas. Any hazardous gases, liquids or solids that are produced can be purified into commercially valuable byproducts or recycled to the process, which does not release hazardous materials to the environment.

25 Claims, 1 Drawing Sheet

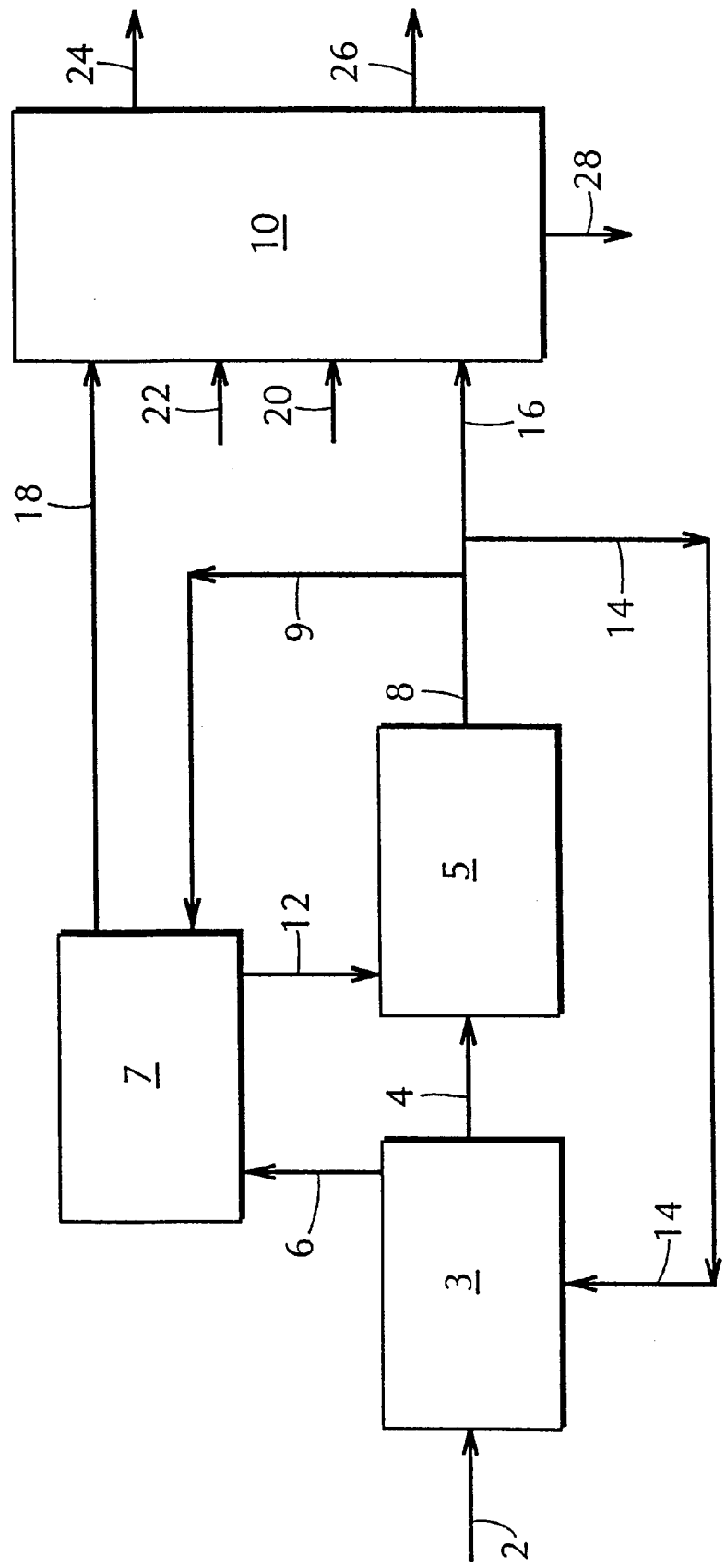

PARTIAL OXIDATION OF WASTE PLASTIC MATERIAL

This application claims the benefit of U.S. Provisional Application Nos. 60/021,878; 60/021,879; and 60/021,885; and 60/024,472, all filed Jul. 17, 1996, filed Aug. 23, 1996, and is a continuation of application Ser. No. 08/888,144 filed Jul. 3, 1997.

BACKGROUND OF THE INVENTION

1. Field of the Invention

This invention relates to an environmentally safe process for converting waste plastic materials to valuable gas products and environmentally nontoxic slag, and more particularly to a minimum liquid discharge integrated liquefaction and gasification process for converting bulk halogen-containing waste plastic materials into a liquid hydrocarbonaceous feedstock that can be used in a partial oxidation reactor to produce a synthesis gas that is primarily carbon monoxide and hydrogen, and a non-leachable environmentally nontoxic slag.

2. Description of the Prior Art

Waste plastic materials, especially halogen-containing waste plastic materials, and particularly those with a high chloride content present especially difficult disposal problems, since these materials are subject to increasingly stringent environmental restrictions against dumping or landfill disposal. Burning the waste plastic materials is feasible only if conducted in accordance with strict environmental restrictions against atmospheric disposal of chloride-containing gases and toxic particulate by-products.

Canadian Patent Application No. 2,130,019 to Gerhardus et al. relates to a process for thermally cracking waste plastic materials which then undergo partial oxidation to produce synthesis gas. However, it is necessary to dehalogenate the waste plastic materials prior to partial oxidation because of severe corrosion problems that can occur without dehalogenation when halide-containing vapors accompanying the syngas products are cooled and condensed. The halide vapors, primarily in the form of hydrogen chloride are condensed from the gaseous degradation products which occur during liquefaction of the waste plastic materials. Dehalogenation, especially dechlorination prior to partial oxidation is an important concern because the Canadian patent relies upon radiant cooling of the partial oxidation gasification products. Therefore, the presence of hydrogen chloride or halide vapors would present severe corrosion problems in the equipment used in the process of the Canadian patent.

German Patent Application DE 4412360A1 to Rabe et al. discloses a process for recycling mixed and contaminated waste plastic materials in a gasification reaction to produce carbon monoxide and hydrogen. The German process utilizes liquefaction and gasification steps but does not address the problem of dealing with halogen-containing waste plastic materials.

As used herein, a partial oxidation reactor can also be referred to as a "partial oxidation gasifier," or simply a "gasifier," and these terms are often used equivalently and interchangeably. The partial oxidation reactors that are used in this invention are also commonly referred to as "quench gasifiers."

Reaction temperatures for partial oxidation typically range from about 900° C. to about 2,000° C., preferably from about 1,200° C. to about 1,600° C. Pressures typically range from about 1 to about 250 atmospheres, preferably from about 5 to about 200 atmospheres, most preferably about 20 to about 80 atmospheres.

Partial oxidation reactors are disclosed in U.S. Pat. No. 4,823,741 to Davis et al., U.S. Pat. No. 4,889,540 to Segerstrom et al., U.S. Pat. Nos. 4,959,080 and 4,979,964, both to Stemling, U.S. Pat. No. 5,281,243 to Leininger, and U.S. Pat. Nos. 5,554,202 and 5,545,238 both to Brooker et al.

SUMMARY OF THE INVENTION

The present invention relates to an integrated liquefaction and gasification process for converting bulk particulate halogen-containing waste plastic materials with minimal particle size reduction into a synthesis gas and a non-leachable, vitreous environmentally nontoxic slag. The process involves melting and cracking bulk particulate halogen-containing waste plastic material to form a lower boiling point, lower molecular weight halogen-containing oil composition which undergoes partial oxidation in a quench gasifier to produce a synthesis gas. Any hazardous gases, liquids or solids that are produced can be purified into commercially valuable byproducts or recycled to the process, which does not release hazardous materials to the environment.

BRIEF DESCRIPTION OF THE DRAWING

The accompanying drawing is a simplified diagrammatic representation of the liquefaction and partial oxidation stages of the process.

DESCRIPTION OF THE PREFERRED EMBODIMENTS

The present invention is an improved environmentally safe liquefaction process for converting waste plastic materials having a high or variable halogen content into a hydrocarbonaceous feedstock for a partial oxidation reaction in a quench gasifier to produce a synthesis gas or "syngas" which primarily comprises carbon monoxide and hydrogen.

An important advantage of the liquefaction process is that it can convert bulk waste plastic material having high halogen content, into a thermally cracked oil with a minimal amount of particle size reduction, or halogen removal prior to liquefaction. The cracked oil that is produced from the waste plastic material during liquefaction serves as the primary source of the hydrocarbonaceous reactant in the partial oxidation reaction to produce synthesis gas.

The products of liquefaction include a thermally cracked oil which does not vaporize at the melting and cracking temperatures during liquefaction. The thermally cracked oil is also referred to as a "heavy oil." Liquefaction also produces condensible vapors, referred to as "condensed gases" or "condensates," and non-condensible vapors which do not condense under the cooling conditions of the liquefaction process.

It has been discovered that the wide variations in chemical composition of the waste plastic material are not reflected in the chemical composition of the thermally cracked oil. Thus, the chemical composition of the thermally cracked oil or the heavy oil is significantly less variable, than the waste plastic material, whereas the chemical composition of the condensates and/or the noncondensible gases is more consistent with that of the waste plastic feed.

This is a significant factor because the thermally cracked oil constitutes about 70 weight % to about 80 weight % of the gasifier feedstock. Therefore, a stable composition is important. The variation in chemical composition of the condensates can be attenuated by blending. The composition variation in the noncondensible gases can be dealt with by using these gases as a fuel for the heating unit employed in the liquefaction process.

The inventive process is capable of partially oxidizing the liquefied halogen-containing waste plastic materials into useful synthesis gas with minimal liquid discharge and is environmentally nontoxic. By "environmentally nontoxic" is meant that substantially no toxic gases, liquids or solids are released to the environment. The process is designed to self-contain and not release any toxic vapors, liquids or particulate solids enter the environment. The slag byproduct is vitreous and non-leachable, and can be used as a landfill or in construction.

The term "vitreous slag" refers to a slag which chemically or physically binds elements and/or compounds which can be harmful to the environment in their free state. These bound elements and/or compounds are resistant to leaching from the slag. Consequently the vitreous slag produced herein is an environmentally nontoxic slag.

The particle size reduction of bulk waste plastic in conventional processes prior to liquefaction is perhaps one of the most expensive aspects of a waste plastic recovery operation. A principal advantage of the inventive process is that only minimal size reduction of the scrap plastic is needed. Size reduction to an average particle size of about 18 inches is all that is needed to feed the waste plastic material to the liquefaction step. However, reducing the particle size to an average particle diameter of about 6 inches and preferably about 2 inches is desirable to facilitate magnetic removal of metal contaminants or components contained in the scrap plastic. These particulate sizes denote bulk particulate waste plastic materials that have been subjected to minimal particle size reduction and which can be conveniently transported, such as by pumping the bulk particulate waste plastic materials to a liquefaction vessel.

In contrast, conventional liquefaction processes require particulate size reduction of the waste plastic to less than 1 centimeter. This generally requires expensive grinding and other equipment and special conditions to prevent melting and agglomeration of the plastic from the mechanical heat generated by such grinding operations.

Therefore, the inventive process can be characterized as "robust" because of its powerful capacity to liquefy and partially oxidize waste plastic materials with a minimal amount of size reduction. This is an important feature and benefit of the invention.

Another advantage of the inventive process is that the heat necessary to melt and crack the waste plastic material to form a hot liquid or oil, is substantially completely supplied by heat values recovered from the operational steps of the process. Therefore, the process can also be characterized as being substantially or completely autogenous.

The prior art conditions for dehalogenation are much more limiting than the simple melting, viscosity reduction and cracking operations conducted in accordance with the present invention. This is because the prior art processes operate to yield a liquid product with less than 200 parts per million (ppm) halide, preferably less than 50 ppm. In the present invention, the dehalogenation that occurs during liquefaction is incidental, and not needed, nor even particularly desirable. The prior art processes crack and operate to dehalogenate whereas the present invention cracks and operates primarily to lower the viscosity of the cracked oil formed from the waste plastic material.

Conventional dehalogenation produces a halogen-acid stream contaminated with organic materials such as organic acids, aromatics, esters, aldehydes, glycols, and the like. This halogen-acid stream is suitable only for incineration to recover pure halogen acids or salts, and is not salable as an acid because of the organic fraction contained therein. It is also not useful as a fuel or organic feedstock because the halogen content is corrosive to combustion equipment and requires stack gas scrubbing to prevent halogen-acid emissions, such as HCl. If used as an organic feedstock the halogen content can poison the catalyst and contaminate the product. Apart from the present invention, the acid stream from dehalogenation of plastics must be incinerated to yield an organic-free acid.

The waste plastic material used in the inventive process can be derived from thermoplastic or thermosetting plastics that have been used in the packaging, structural, building, electrical and textile industries. Most often these materials are obsolete or waste plastics that are no longer desirable and have been used in the manufacture of articles for daily use in the home or industry, such as containers, packaging materials, household devices, sporting equipment and toys. Waste plastic materials can also be derived from faulty manufacturing batches and unutilizable remains and residue from the production and processing of various plastic articles. Thus, plastic wastes can be simply characterized as post-consumer waste or obsolete plastic material which cannot be regenerated or economically reused. All plastics found in household waste can be tolerated in the process.

Waste plastic materials which can be used in the present invention include polyolefins, vinyl resins such as poly (vinyl chloride), poly(vinyl acetate) and poly(vinyl alcohol). In addition, polystyrenes, polycarbonates, poly(methylene oxides), polyacrylates, polyurethanes, polyamides, polyesters and hardened epoxide resins can also be used.

Referring to the FIGURE, halogen-containing bulk waste plastic materials 2 are fed to a melting vessel 3 where the waste plastic material 2 comes into direct contact with hot oil melting medium 14 under substantially oxygen-free conditions and at the minimum temperature necessary to melt the waste plastic to form a molten viscous mixture 4 comprising the halogen-containing waste plastic material 2 and the hot oil 14. The melting temperature of the bulk waste plastic is maintained as low as possible to minimize production of offgases 6 which vaporize from the waste plastic material during the melting step and comprise hydrogen halides, light hydrocarbons, halohydrocarbons such as methyl chloride and ethyl chloride, and carbon dioxide and water vapor. The most common halogen-containing compound is hydrogen chloride which is primarily produced from waste polyvinylchloride. The preferred melting temperature range is about 110° C. to about 375° C.

The offgas vapor stream 6 generated from the waste plastic material during the melting step is passed to a cooler 7. The molten viscous mixture 4 of melted plastic in hot oil is passed to heater 5 which operates at the minimum temperature necessary to thermally crack the molten viscous plastic mixture 4 into a lower boiling point, lower molecular weight halogen-containing hot oil composition 8 with reduced viscosity. The preferred viscosity is less than about 3,000 centipoise (cp), preferably about 1,000 cp or less, wherein the viscosity is measured at the exit temperature of heater 5, which varies from about 350° C. to about 430° C., and is also the operative temperature range for the thermal cracking operation. Operating the heater 5 at this temperature minimizes the amount of offgas vapor stream 9 which generally comprises hydrogen halides, halohydrocarbons, light hydrocarbons and carbon dioxide.

Substantially no water vapor is produced in offgas stream 9 which is separated from hot cracked oil 8. The offgas vapor stream 9 and the offgas vapor stream 6 enter the cooler 7 wherein they undergo condensation at a temperature of about 20° C. to about 70° C., to form a condensed gas stream 18 comprising a water miscible condensate, a non-water miscible hydrocarbon condensate and any condensed halides. If desired, the non-water miscible hydrocarbon condensate or a portion thereof can be separated, purified and sold commercially. A non-condensed organic gas stream 12 is also produced which serves as a fuel for heater 5. A portion 14 of hot cracked oil stream 8 is recycled to the melting vessel 3 to serve as the melting medium.

Typically, the hot oil stream 14 is recycled to the melting vessel 3 at a weight ratio of hot oil stream 14 to bulk waste plastic materials 2 of about 1:1 to about 6:1, respectively.

It has also been found that by introducing $H_2O$ into the melting vessel 3 and/or the heater 5, the formation of gaseous halohydrocarbon compounds and other polar compounds such as acetone in the offgas streams 6 and 9 can be suppressed or minimized. Chloromethane or methyl chloride, $CH_3Cl$, is the most volatile of the halohydrocarbonous formed from the liquefaction of waste plastic materials, and is most likely to contribute to the problems caused by the chlorine content of non-condensed fuel gas 12 entering the process heater 5.

To suppress the formation of gaseous halohydrocarbon compounds, $H_2O$ preferably in the form of steam can be introduced into the molten oil/plastic mixture 4, and/or the cracked oil stream 8, and/or the recycle hot oil stream 14, and/or directly into melting vessel 3. In addition, the bulk waste plastic material 2 can be contacted with $H_2O$ as it is introduced into the heating vessel 3.

Another benefit of introducing steam or water to the liquefaction process is that the steam can condense a substantial amount of hydrogen chloride (HCl) vapor. The process water condenses halogen acid vapors in offgas streams 6 and 9, thus preventing or minimizing the halogen acid vapors from becoming part of the non-condensible gas stream 12 that enters the heater 5. However the amount of $H_2O$ must be carefully monitored for optimum results. Increasing the amount of water increases the load on the cooler/condenser 12. It has been found that about 5 weight % to about 15 weight % water in the waste plastic feed to melting vessel 2 or introduced into the reactor section of the gasifier 10 represents a good balance between acid content in noncondensible gases and the thermal load on the coolers.

The water content of the waste plastic materials 2 is generally sufficient to supply the necessary amount of steam to supress the formation of gaseous halohydrocarbon compounds. However, the presence of halohydrocarbons in the non-condensed gas stream 12 would indicate the need for additional steam on the order of about 5 weight % $H_2O$ to about 10 weight % $H_2O$, based on the total weight of the waste plastic feed.

It has been found that about 10 weight % $H_2O$ in the form of steam, based on the total weight of the waste plastic feed, added directly to the molten oil/plastic mixture fed to the heater resulted in about an 86% reduction of chloromethane in the offgas.

The condensed gas stream 18 containing any remaining condensed halides is fed to the gasifier 10 for the partial oxidation reaction. During the partial oxidation reaction, a synthesis gas is produced comprising carbon monoxide, hydrogen, carbon dioxide, water vapor and gaseous halides HX, where X can be chlorine, fluorine, bromine or iodine.

The non-condensed gas stream 12 from the cooler 7 that enters the heater 5 serves as a fuel therein to increase the temperature to the level needed to thermally crack the viscous molten plastic 4 into the cracked hot oil stream 8. The cracking temperature varies from about 360° C. to about 430° C. A portion of the cracked hot oil stream 8 exiting the heater 5 is divided into streams 14 and 16 after the offgas stream 9 is separated therefrom. Hot cracked oil stream 14 is recycled to the melting vessel 3 to serve as the hot oil melting medium used to directly contact and melt the waste plastic material 2 entering melting vessel 3.

During startup, used motor oil, or any low volatility oil, or cracked oil retained from the process, can be used as the melting medium. However, once the process has become operational, the recycle stream 14 of hot cracked oil furnishes substantially or completely the entire melting medium needed to melt the halogen-containing bulk waste plastic materials 2 in the melting vessel 3.

Hot cracked oil stream 16 enters the gasifier 10 with condensed gas stream 18 to serve as the complete or substantially complete hydrocarbonaceous reactant for the partial oxidation reaction. Cracked oil stream 16 contains the remaining unvaporized halogen content of the waste plastic material, which can vary from about 0.01 weight % to about 2 weight % of oil stream 16. Oxygen or an oxygen-containing gas stream 22, such as air is fed into the reaction zone (not shown) of the quench gasifier 10 to serve as the oxidizing agent for the partial oxidation reaction.

A low heating value material 20 can be used as a temperature moderator to control the temperature in the reaction zone of the gasifier. The low heating value material 20 is passed into the reaction zone of the gasifier in amounts sufficient to control or moderate the temperature in the reaction zone to about 1200° C. to about 1600° C. The temperature moderator can be water, steam, ash, $CO_2$, $CO_2$-rich gas, nitrogen, recycled synthesis gas and the like.

The partial oxidation reaction conducted in the gasifier 10 with the cracked oil 16, condensed gases 18, and the oxidizing agent 22 produces a synthesis gas or "syngas" comprising primarily carbon monoxide and hydrogen, and smaller amounts of carbon dioxide, water vapor, hydrogen sulfide, carbonyl sulfide, hydrogen halides and methane. A molten slag byproduct is also produced.

The syngas and the slag are passed into the quench zone (not shown) of the gasifier 10 and contacted with water, referred to as "quench water." The scrubbed syngas exits the quench zone of the gasifier 10 as syngas stream 24 and is purified for further use. The slag 28 exits the quench zone of the gasifier 10 and is in a vitreous, non-leachable state and is environmentally nontoxic. The slag 28 can be used as a building material, for road fill or other purpose. The hydrogen halide gases which are produced in the reaction zone of the gasifier are condensed to form acid halides which are neutralized in the quench zone to form halide salts, such as $NH_4Cl$, $NaCl$, $CaCl_2$, $MgCl_2$, or any other equivalent halide salt, with another halogen substituted for chlorine.

A portion 26 of the quench water from the quench zone of the gasifier 10 is continuously removed and is commonly referred to as the "blowdown". The blowdown stream 26 contains any remaining finely divided residual particulate solid material and the condensed halide salts. The amount of blowdown quench water 26 that is continuously removed from the quench zone of the gasifier is based on the halide content and the amount of residual solids contained in the quench water. The halide content and the amount of finely divided residual solids is periodically measured from samples or by a process analyzer. The rate of quench water 26 removed, also referred to as "the blowdown rate" is set to maintain the halide salt concentration well below its saturation concentration under all operating conditions in the quench water system. Typically, these salt concentrations vary from about 1000 ppm to about 20 weight % of the quench water system. The rate of removal of the quench water is coordinated and regulated with the quench water supplied to the quench zone to maintain a constant and steady supply of quench water in the quench zone.

EXAMPLE 1

A mixture of waste plastic materials is heated to 750° F. (399° C.) and melted in a stirred batch reactor at one atmosphere and held at this temperature for 30 minutes, to yield 80 weight % oil, 15 weight % condensible vapor, and 5 weight % noncondensible vapor (at 90° F. and 1 atmosphere). The viscosity of the product oil is about 300 centipoise at 600° F. At 800° F. (427° C.) and the same time and pressure conditions, i.e., 1 atmosphere and 30 minutes, the gas yield increases to 20 weight % and is in excess of the fuel needed for the liquefaction stage, and unsuitable for gasification, because it would be economically unfeasible to compress the excess gas and put it in the gasifier. Therefore the excess gas would be usable only if capable of being blended with associated on-site fuel gas usage.

EXAMPLE 2

Several tons of post-consumer waste plastic materials are added over a period of 5 days to a melt tank wherein the initial start-up melting medium is used motor oil, until replaced by the continuous circulation of the mixture of cracked oil and plastics to a fired process heater and back to the melting tank as in the FIGURE. The melting temperature ranges from 400° F. to 700° F. at one atmosphere pressure. The entire molten mixture is heated to 780° F. (416° C.) in the fired process heater and returned to the melt tank. Averaged over several days, the ratio of recycled oil to plastics feed exceeds 50:1. The mass of condensible vapor and noncondensible gas generated is equivalent to the mass of plastics added.

EXAMPLE 3

Several tons of post consumer waste plastic materials are added to melt tank 3 over a period of 12 days. The mixture of oil and melted plastics leaving the melt tank is circulated through a fired heater 5 and returned to the melt tank 3 as in the FIGURE except that a portion of condensate and heavy oils are withdrawn to storage periodically to maintain levels in the process vessels. The oils are later gasified from storage. Condensible vapors and noncondensible gases are continuously removed to storage tanks. The molten mixture is heated to temperatures ranging from 650° F. (343° C.) to 780° F. (416° C.) in the heater 5 prior to being recirculated to the melt tank 3 which operates between 500° F. (260° C.) and 680° F. (360° C.). The residence time in the heater 5 averages five minutes. The gas yield ranges from 10 to 20 weight percent, and the cracked oil yield ranges from 60 to 80 weight %. Almost no viscosity reduction of the plastic/cracked oil mixture is observed at cracking temperatures below 650° F. (343° C.). The viscosity of the cracked oil leaving the process heater ranges from 80 to 300 centipoise at 600° F. (316° C.). The plastic derived oil and condensate generated undergo partial oxidation in gasifier 10.

The gasification performance of this oil is equal to or better than other heavy oils commercially gasified in that the conversion of carbon to synthesis gas is higher at the same gasification conditions. In all of these cases, less then 20 weight % of the chlorine in the feed plastics remained in the heavy oil.

What is claimed is:

1. A liquefaction process for converting a halogen-containing bulk waste plastic material into the liquid hydrocarbonaceous feedstock for a partial oxidation reaction to produce a synthesis gas, comprising:
    (a) melting a halogen-containing bulk waste plastic material at atmospheric conditions in a melting zone in direct contact with a hot oil heating medium generated from the waste plastic material at a first temperature sufficient to produce a molten viscous mixture of the halogen-containing waste plastic material with the hot oil, and a first offgas;
    (b) thermally cracking the molten viscous oil/plastic mixture in a heating zone at a second temperature sufficient to produce a halogen-containing cracked oil composition of reduced viscosity,
    (c) partially oxidizing the cracked oil in the reaction zone of a quench gasifier wherein the cracked oil serves as the primary hydrocarbonaceous reactant in a non-catalytic partial oxidation reaction to produce a synthesis gas containing hydrogen halides;
    (d) quenching the synthesis gas in the quench zone of the gasifier, wherein the synthesis gas is contacted with a quench water containing sufficient neutralizing agent to condense and neutralize the hydrogen halides in the synthesis gas and thereby form condensed halide salts which are separated and recovered from the quench water, and a substantially halogen-free synthesis gas.

2. The method of claim 1, wherein the bulk waste plastic material is melted in the presence of $H_2O$ in the melting zone to suppress the formation of halohydrocarbon vapors in the first offgas.

3. The method of claim 2, wherein the $H_2O$ is contacted with the bulk waste plastic material entering the melting zone.

4. The method of claim 1, wherein a portion of the cracked halogen containing oil exiting the heater is separated and recycled to the melting zone to serve as the hot oil melting medium.

5. The method of claim 2, wherein the $H_2O$ is supplied to the melting zone in the form of steam.

6. The method of claim 2, wherein the $H_2O$ is supplied to the cracked oil stream exiting the heating zone.

7. The method of claim 2, wherein the $H_2O$ is supplied to the molten viscous oil/plastic mixture prior to its introduction into the heating zone.

8. The method of claim 1, wherein the first offgas is cooled and condensed to form a water miscible condensate, a non-water miscible condensate and a mixture of non-condensed gases.

9. The method of claim 8, wherein the water miscible and the non-water miscible condensates are introduced into the reaction zone of the quench gasifier.

10. The method of claim 1, wherein the halogen-containing bulk waste plastic material provides substantially the entire hydrocarbonaceous reactant for the partial oxidation reaction.

11. The method of claim 1, wherein the bulk halogen-containing waste plastic material undergoes minimal size reduction prior to the melting step.

12. The method of claim 11, wherein the average particle size diameter of the bulk waste plastic material varies from about 2 inches to about 18 inches.

13. The method of claim 1, wherein the melting step is conducted in the absence of a catalyst.

14. The method of claim 1, wherein the halogen content of the waste plastic material varies from about 0.5 weight % to about 10 weight %.

15. The method of claim 1, wherein the halogen-containing bulk waste plastic material is melted at a temperature of about 110° C. to about 375° C.

16. The method of claim 1, wherein the molten viscous oil/plastic mixture is cracked at a temperature of about 360° C. to about 430° C.

17. The method of claim 1, wherein a second offgas is produced during the cracking step.

18. The method of claim 17, wherein the second offgas is cooled and condensed with the first offgas.

19. The method of claim 8, wherein the non-water miscible hydrocarbon condensate mixture is purified.

20. The method of claim 1, wherein a low heating value material selected from the group consisting of water, ash, inert gases and mixtures thereof, is introduced into the reaction zone of the gasifier to serve as a temperature moderator.

21. The method of claim 20, wherein the temperature moderator is water.

22. The method of claim 1, wherein a portion of the quench water is continuously removed from the quench zone, based upon the halogen content of said water.

23. The method of claim 1, wherein a portion of the quench water is continuously removed from the quench zone, based upon the amount of residual particulates contained in said water.

24. The method of claim 1, wherein the particle size reduction of the bulk waste plastic material is minimal and only to the extent that it can be conveniently introduced to the melting step.

25. The method of claim 1, wherein the thermally cracked oil provides about 70 weight % to about 80 weight % of the hydrocarbonaceous reactant for the gasifier.

* * * * *